United States Patent
Wang et al.

(10) Patent No.: US 10,969,497 B1
(45) Date of Patent: Apr. 6, 2021

(54) DYNAMIC BASELINE POSITION DOMAIN MONITORING SYSTEM

(71) Applicant: Beihang University, Beijing (CN)

(72) Inventors: Zhipeng Wang, Beijing (CN); Yanbo Zhu, Beijing (CN); Kai Kang, Beijing (CN); Kun Fang, Beijing (CN); Qiang Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 17/012,285

(22) Filed: Sep. 4, 2020

(30) Foreign Application Priority Data

Jul. 8, 2020 (CN) .......................... 202010651613.7

(51) Int. Cl.
  *G01S 19/44* (2010.01)
  *G01S 19/04* (2010.01)
  *G01S 19/39* (2010.01)
(52) U.S. Cl.
  CPC .............. *G01S 19/44* (2013.01); *G01S 19/04* (2013.01); *G01S 19/396* (2019.08)
(58) Field of Classification Search
  CPC ......... G01S 19/04; G01S 19/396; G01S 19/44
  See application file for complete search history.

(56) References Cited

U.S. PATENT DOCUMENTS

| 2001/0020214 A1* | 9/2001 | Brenner | G01S 19/071 |
| | | | 701/470 |
| 2004/0133341 A1* | 7/2004 | Spriggs | G08G 5/025 |
| | | | 701/435 |
| 2014/0062765 A1* | 3/2014 | Brenner | G01S 19/15 |
| | | | 342/357.3 |
| 2017/0243497 A1* | 8/2017 | Kuttappan | G08G 5/0078 |

\* cited by examiner

*Primary Examiner* — Dao L Phan
(74) *Attorney, Agent, or Firm* — Locke Lord LLP; Tim Tingkang Xia, Esq.

(57) ABSTRACT

A dynamic baseline position domain monitoring system based on satellite navigation and inertial navigation is used to perform a method, including: a) determining a coordinate system and a transformation matrix; b) calculating a theoretical coordinate value of an antenna baseline vector in a earth-centered earth-fixed coordinate system during the movement of a base station carrier; c) determining the number of antenna baseline vectors to be monitored; d) solving the measurement values of the antenna baseline vectors; e) calculating the position domain error of an antenna baseline vector change rate in three directions of x, y and z at epoch k, and normalizing the position domain errors to obtain a normalized value of the position domain errors; f) obtaining the a cumulative sum; g) comparing the cumulative sum with an error monitoring threshold value, and issuing an integrity risk alarm.

10 Claims, 5 Drawing Sheets

DYNAMIC BASELINE POSITION DOMAIN MONITORING SYSTEM

CROSS-REFERENCE TO RELATED PATENT APPLICATION

This non-provisional application claims priority to and the benefit of, pursuant to 35 U.S.C. § 119(a), patent application Serial No. CN2020106516137 filed in China on Jul. 8, 2020. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present disclosure relates to the technical field of satellite navigation and inertial navigation, and in particular to a dynamic baseline position domain monitoring system based on satellite navigation and inertial navigation.

BACKGROUND

Differential positioning technology refers to using two Global Navigation Satellite System (GNSS) receivers to observe the same group of satellites at the same time and collect satellite navigation data. Different from the absolute position coordinates obtained by single point positioning, the difference technique obtains the relative position of two receivers. If the position of one receiver is known, the exact position of the other receiver can be calculated.

A Ground Based Augmentation System (GBAS) is an important part of a satellite navigation system, and its working principle is to improve the precision of satellite navigation through differential positioning, and on this basis, an integrity monitoring algorithm is added to improve the indicators of system integrity, availability and continuity, so that the aircraft with corresponding capabilities in the range of action can obtain the position signal reaching 1 Category-I precision approach (CAT I) or even higher precision, and then the aircraft is guided to implement approach and landing flight. Ground reinforcement technology can meet the strict requirements of integrity, continuity and availability of civil aviation precision approach and landing guidance by applying differential reinforcement and integrity monitoring technology.

A kinematical-to-kinematical approach guidance system is a new generation of landing guidance systems, which is used to support the precise approach and landing of an aircraft using a Global Navigation Satellite System (GNSS). A kinematical-to-kinematical approach guidance system consists of three parts: a space section, a dynamic carrier section and an airborne section. The space section provides the GNSS ranging signals and orbit parameters for the dynamic carrier section and airborne section. The dynamic carrier section generates difference and integrity enhancement information needed for landing. The airborne section uses the difference and integrity enhancement information generated by the dynamic carrier section and the GNSS navigation information received by itself to perform relative positioning and integrity calculation.

The kinematical-to-kinematical approach guidance system studied at present realizes the following three main functions. Firstly, the system through communication obtains the final approach section data related to the reference trajectory of the approach aircraft; Secondly, the system broadcasts differential GNSS signal correction values including Beidou to eliminate system errors in GNSS signals so as to improve navigation accuracy. Thirdly, the system provides an alarm for the degradation of navigation quality caused by poor satellite geometry, internal system failure or dangerous external interference. On the premise of sufficient reliability, these functions can support the automatic landing of unmanned aerial vehicles and manned aircraft under severe conditions on dynamic carriers.

Compared with the traditional approach guidance system equipped by a ground static base station to provide precise guidance information for an aircraft in an approach landing stage to ensure the safe landing, the kinematical-to-kinematical approach guidance system has many different problems and challenges in the practical application process. First of all, unlike the static base station, the carrier of the base station moves in real time in the process of kinematical-to-kinematical approach landing of the aircraft (for example, an offshore mobile platform, an aircraft carrier and other landing platforms), and because of the change of attitude of the carrier during navigation, there may be pitching and rolling in the landing environment. Secondly, the base station carrier is not an absolute rigid body, which will produce bending and length deformation under the stress of extrusion, tension and shear in practical applications, which will affect the initial measurement values of the carrier and the navigation measurement values in use. Thirdly, the space of the base station carrier is very limited, so it is necessary to select a suitable position to place the reference receiver antenna with the premise of not disturbing the normal operation and still providing a clear field of view, and at the same time, it is necessary to consider the bending compensation of the carrier itself to be incorporated in the process of transferring the reference antenna position to the landing site of the aircraft. In view of this, the safety standards required for kinematical-to-kinematical approach guidance are more stringent, and more complex and perfect navigation algorithms are needed.

Antenna Motion will cause errors in the measurement of the antenna position of the reference receiver and the vector position of the baseline between antennas, which will affect all the related measurement values and directly lead to the deviation of a GNSS navigation solution. As mentioned above, during the kinematical-to-kinematical approach, when the carrier is deformed and bent or the structural position between antennas changes, such errors may occur, thus changing the relative position between the reference antenna and the landing point of the aircraft. During the movement of the base station carrier, the antennas regarded as pseudo users and other antennas regarded as base stations are moving, that is, the baseline vector between the receiver antennas is also moving, which is called a moving baseline. In order to ensure the accurate position transformation between the reference antenna and the landing point on the carrier, it is necessary to determine the unique relative position of the pseudo-user relative to the base station and meanwhile perform position domain monitoring on the antenna baseline vector.

In the prior art, the position domain monitoring is aimed at static position domain monitoring. For example, the Local Area Augmentation System (LAAS) is a GBAS system built in the United States, and its services focus on the accurate approach and departure processes and the operation of air terminals in local areas of airports. Stanford University has developed Position domain monitoring, PDM) algorithms applied in the LAAS, and implemented these algorithms in post-processing software on Integrity Monitor Testbed, IMT). However, the existing static position domain monitoring is difficult to realize the position domain monitoring of the antenna baseline vector in kinematical-to-kinematical approach.

Protect Level (PL) is an integrity monitoring index, and its value should ensure that the probability that the actual error falls outside the error envelope is less than or equal to the corresponding integrity risk. At the same time, the protection level should be as small as possible on the premise of meeting the integrity requirements, otherwise the availability of the system may be affected.

Therefore, in order to solve the technical problem of errors in vector position measurement of baselines between antennas in the prior art, a dynamic baseline position domain monitoring system based on satellite navigation and inertial navigation is needed.

SUMMARY

One aspect of the present disclosure is to provide a dynamic baseline position domain monitoring system based on satellite navigation and inertial navigation, comprising:
a carrier;
a user terminal configured to receive a guidance signal sent by the carrier and land according to the guidance signal;
a plurality of base stations arranged on the carrier, wherein the base stations and the carrier are configured to move together, and the base stations are configured to receive satellite signals, monitor a dynamic baseline position domain and guide the user terminal to land;
a satellite configured to transmit the satellite signals to the base stations on the carrier; and
wherein the base stations are configured to receive the satellite signals and monitor the dynamic baseline position domain by the following steps:
a) determining a topocentric coordinate system, a carrier coordinate system, an earth-centered earth-fixed rectangular coordinate system, a first transformation matrix between the topocentric coordinate system and the carrier coordinate system, and a second transformation matrix between the topocentric coordinate system and the earth-centered earth-fixed rectangular coordinate system;
b) calculating a theoretical coordinate value of an antenna baseline vector in the earth-centered earth-fixed coordinate system during movement of the carrier and the base stations;
c) combining a pseudo user with reference stations according to the base stations arranged on the carrier, and determining a number of antenna baseline vectors to be monitored;
d) solving a measurement value of the antenna baseline vector by using a dual-carrier phase measurement values of the pseudo user and a reference station for the satellite;
e) obtaining a position domain error of an antenna baseline vector change rate in three directions of x, y and z at epoch k according to the theoretical coordinate value of the antenna baseline vector in the earth-centered earth-fixed coordinate system and the measurement value of the antenna baseline vector, and normalizing the position domain error to obtain a normalized value of the position domain error;

f) calculating an error monitoring threshold value of the antenna baseline vector, performing square normalization processing on the normalized value of the position domain error in three directions of x, y and z, and inputting an obtained square normalized value into a cumulative sum algorithm to obtain a cumulative sum; and g) comparing the cumulative sum with the error monitoring threshold value, and when the cumulative sum exceeds the error monitoring threshold value, issuing an integrity risk alarm.

Preferably, the topocentric coordinate system is expressed as: $[X_L\ Y_L\ Z_L]^T$, the carrier coordinate system is expressed as: $[X_b\ Y_b\ Z_b]^T$, and the earth-centered earth-fixed coordinate system is expressed as: $[X_e\ Y_e\ Z_e]^T$, wherein a transformation between the topocentric coordinate system and the carrier coordinate system is performed by the following formula:

$$\begin{bmatrix} X_L \\ Y_L \\ Z_L \end{bmatrix} = \begin{bmatrix} X_{0L} \\ Y_{0L} \\ Z_{0L} \end{bmatrix} + R \begin{bmatrix} X_b \\ Y_b \\ Z_b \end{bmatrix},$$

wherein R is the first transformation matrix, $[X_{0L}\ Y_{0L}\ Z_{0L}]^T$ is a topocentric coordinate of the carrier, and R satisfies:

$$R = \begin{bmatrix} \cos r \cdot \cos y - \sin r \cdot \sin p \cdot \sin y & -\sin y \cdot \cos p & \sin r \cdot \cos y + \sin p \cdot \sin y \cdot \cos r \\ \sin y \cdot \cos r + \sin r \cdot \sin p \cdot \cos y & \cos p \cdot \cos y & \sin r \cdot \sin y - \sin p \cdot \cos r \cdot \cos y \\ -\sin r \cdot \cos p & \sin p & \cos r \cdot \cos p \end{bmatrix}$$

wherein p, r and y are a pitch angle, a roll angle and a heading angle of the carrier respectively;

wherein a transformation between the topocentric coordinate system and the earth-centered earth-fixed coordinate system is performed by the following formula:

$$\begin{bmatrix} X_e \\ Y_e \\ Z_e \end{bmatrix} = \begin{bmatrix} X_{0e} \\ Y_{0e} \\ Z_{0e} \end{bmatrix} + R_L^e \begin{bmatrix} X_L \\ Y_L \\ Z_L \end{bmatrix},$$

wherein $R_L^e$ is the second transformation matrix, $[X_{0e}\ Y_{0e}\ Z_{0e}]^T$ is an earth-centered earth-fixed coordinate of a topocentric origin, and $R_L^e$ satisfies:

$$R_L^e = \begin{bmatrix} -\sin\theta & -\cos\theta \cdot \sin\varphi & \cos\theta \cdot \cos\varphi \\ \cos\theta & -\sin\theta \cdot \cos\varphi & \sin\theta \cdot \cos\varphi \\ 0 & \cos\varphi & \sin\varphi \end{bmatrix},$$

wherein $\theta$ and $\varphi$ are the longitude and latitude of the carrier respectively.

Preferably, during the movement of the carrier and the base stations, the theoretical coordinate value of the antenna baseline vector in the earth-centered earth-fixed coordinate system is calculated by the following formula:

$$\begin{bmatrix} X'_e \\ Y'_e \\ Z'_e \end{bmatrix} = \begin{bmatrix} X_{0e} \\ Y_{0e} \\ Z_{0e} \end{bmatrix} + R_L^e \begin{bmatrix} X'_L \\ Y'_L \\ Z'_L \end{bmatrix},$$

wherein $R_L^e$ is the second transformation matrix, $[X_e' Y_e' Z_e']^T$ is the theoretical coordinate value of the antenna baseline vector in the earth-centered earth-fixed coordinate system, $[X_{0e}\ Y_{0e}\ Z_{0e}]^T$ is the earth-centered earth-fixed coordinate of the topocentric origin, $[X_L'Y_L'Z_L']^T$ is the coordinate of the antenna baseline vector in the topocentric coordinate system, satisfying:

$$\begin{bmatrix} X'_L \\ Y'_L \\ Z'_L \end{bmatrix} = \begin{bmatrix} X_{1L} \\ Y_{1L} \\ Z_{1L} \end{bmatrix} + R \begin{bmatrix} X_b \\ Y_b \\ Z_b \end{bmatrix} = \begin{bmatrix} X_{0L} \\ Y_{0L} \\ Z_{0L} \end{bmatrix} + \Delta L + R \begin{bmatrix} X_b \\ Y_b \\ Z_b \end{bmatrix},$$

wherein $[X_b\ Y_b\ Z_b]^T$ is the coordinate of the carrier of the base stations in the carrier coordinate system, R is the first transformation matrix, $\Delta L$ is a displacement vector of the carrier of the base stations moving from an initial position to a current position, $[X_{0L}\ Y_{0L}\ Z_{0L}]^T$ is the coordinate of the initial position of the carrier of the base stations in the topocentric coordinate system, and $[X_{1L} Y_{1L}\ Z_{1L}]^T$ is the coordinate of the current position of the carrier of the base stations in the topocentric coordinate system, wherein $$\begin{bmatrix} X_{1L} \\ Y_{1L} \\ Z_{1L} \end{bmatrix} = \begin{bmatrix} X_{0L} \\ Y_{0L} \\ Z_{0L} \end{bmatrix} + \Delta L.$$

Preferably, the step d) comprises the following method steps:

d1) determining a carrier phase measurement value of the pseudo user u for the satellite i as:

$$\emptyset_u^{(i)} = \lambda^{-1} \cdot [r_u^{(i)} + c \cdot (\delta t_u - \delta t^{(i)}) - I_u^{(i)} + T_u^{(i)}] + N_u^{(i)} + \varepsilon_{\emptyset,u}^{(i)},$$

wherein $\emptyset_u^{(i)}$ is the carrier phase measurement value of the satellite i by the pseudo user u, $\lambda$ is a wavelength, $r_u^{(i)}$ is a geometric distance between the pseudo user u and satellite i, c is speed of light, $\delta t_u$ is a pseudo user receiver clock error, $\delta t^{(i)}$ is a satellite clock error, $I_u^{(i)}$ is an ionospheric delay, $T_u^{(i)}$ is a tropospheric delay, $N_u^{(i)}$ is a pseudo user integer ambiguity, and $\varepsilon_{\emptyset,u}^{(i)}$ is a pseudo user carrier phase measurement noise;

d2) determining a single difference carrier phase measurement value of the pseudo user u and the reference station r for the satellite i as:

$$\emptyset_{ur}^{(i)} = \emptyset_u^{(i)} - \emptyset_r^{(i)} = \lambda^{-1} \cdot r_{ur}^{(i)} + f \cdot \delta t_{ur} + N_{ur}^{(i)} + \varepsilon_{\emptyset,ur}^{(i)},$$

wherein $\emptyset_{ur}^{(i)}$ is the single difference carrier phase measurement value of the pseudo user u and reference station r for the satellite i, $\emptyset_u^{(i)}$ is a carrier phase measurement value of the pseudo user u for the satellite i, $\emptyset_r^{(i)}$ is a carrier phase measurement value of the reference station r for the satellite i, $\lambda$ is the wavelength, $r_{ur}^{(i)}$ is a single difference of the geometric distance between the pseudo user u and the satellite i, and the geometric distance between the reference station r and satellite i, f is a carrier frequency, $\delta t_{ur}$ is a single difference between the pseudo user receiver clock error and a reference station receiver clock error, $\varepsilon_{\emptyset,ur}^{(i)}$ is a single difference between the pseudo user integer ambiguity and a reference station integer ambiguity, $\varepsilon_{\emptyset,ur}^{(i)}$ is a single difference between the pseudo user carrier phase measurement noise and a reference station carrier phase measurement noise;

d3) determining a double difference carrier phase measurement value of the pseudo user u and the reference station r for the satellites i and j as:

$$\emptyset_{ur}^{(ij)} = \emptyset_{ur}^{(i)} - \emptyset_{ur}^{(j)} = \lambda^{-1} r_{ur}^{(ij)} + N_{ur}^{(ij)} + \varepsilon_{\emptyset,ur}^{(ij)}$$

wherein $\emptyset_{ur}^{(ij)}$ is the double difference carrier phase measurement value of the pseudo user u and the reference station r for the satellite i and satellite j, $\emptyset_{ur}^{(i)}$ is the single difference carrier phase measurement value of the pseudo user u and the reference station r for the satellite i, $\emptyset_{ur}^{(j)}$ is a single difference carrier phase measurement value of the pseudo user u and the reference station r for the satellite j, and $\lambda$ is the wavelength, $r_{ur}^{(ij)}$ is a double difference of the geometric distances between the pseudo user u and the reference station r and satellite i and satellite j, $N_{ur}^{(ij)}$ is a double difference between the pseudo user integer ambiguity and the reference station integer ambiguity, and $\varepsilon_{\emptyset,ur}^{(ij)}$ is a double difference between the pseudo user carrier phase measurement noise and reference station carrier phase measurement noise;

d4) solving the measurement value of the antenna baseline vector as:

$$\emptyset_{ur}^{(ij)} = \emptyset_{ur}^{(i)} - \emptyset_{ur}^{(j)} = \lambda^{-1} r_{ur}^{(ij)} + N_{ur}^{(ij)} + \varepsilon_{\emptyset,ur}^{(ij)};$$

wherein $b_{ur}$ is a measurement value of the antenna baseline vector between the two receivers of the pseudo user and the reference station, $l^{(i)}$ is an observation direction unit vector of the receiver for the satellite i, and $r_{ur}^{(i)}$ is a single difference geometric distance from the pseudo user u and the reference station r to the satellite i, wherein a double difference geometric distance from the pseudo user u and the reference station r to satellites i and j is as follows:

$$\emptyset_{ur}^{(ij)} = \lambda^{-1}(l^{(i)} - l^{(j)}) \cdot b_{ur} + N_{ur}^{(ij)} + \varepsilon_{\emptyset,ur}^{(ij)};$$

wherein $l^{(j)}$ is an observation direction unit vector of the receivers for the satellite j, wherein the double difference geometric distance from the pseudo user u and the reference station r to the satellites i and j is substituted into the double difference carrier phase measurement value of the pseudo user u and the reference station r for the satellites i and j:

$$\emptyset_{ur}^{(ij)} = \lambda^{-1}(l^{(i)} - l^{(j)}) \cdot b_{ur} + N_{ur}^{(ij)} + \varepsilon_{\emptyset,ur}^{(ij)};$$

wherein the pseudo user u and the reference station r simultaneously observe M satellites and obtain M−1 mutually independent double difference carrier phase measurement values, which are written in the following matrix form:

$$\begin{bmatrix} \emptyset_{ur}^{(21)} \\ \emptyset_{ur}^{(31)} \\ \dots \\ \emptyset_{ur}^{(M1)} \end{bmatrix} = \lambda^{-1} \cdot \begin{bmatrix} -(l^{(2)} - l^{(1)})^T \\ -(l^{(2)} - l^{(1)})^T \\ \dots \\ -(l^{(M)} - l^{(1)})^T \end{bmatrix} \cdot b_{ur} + \begin{bmatrix} N_{ur}^{(21)} \\ N_{ur}^{(31)} \\ \dots \\ N_{ur}^{(M1)} \end{bmatrix},$$

wherein when the double difference carrier phase measurement value is known, a LAMBDA algorithm is used to solve the integer ambiguity, and a double difference integer ambiguity is calculated to solve the measurement value $b_{ur}$ of the antenna baseline vector.

Preferably, the position domain error of the antenna baseline vector change rate in x, y and Z directions at epoch K is calculated as follows:

recording the theoretical coordinate value $[X_e' Y_e' Z_e']^T$ of the antenna baseline vector in the earth-centered earth-fixed coordinate system as:

$$b_t = \begin{bmatrix} X_e' \\ Y_e' \\ Z_e' \end{bmatrix} = \begin{bmatrix} X_t \\ Y_t \\ Z_t \end{bmatrix},$$

wherein the change rate of a theoretical value of the antenna baseline vector at epoch k is:

$$\dot{b}_t(k) = \begin{bmatrix} \dot{X}_t(k) \\ \dot{Y}_t(k) \\ \dot{Z}_t(k) \end{bmatrix},$$

wherein $\dot{X}_t(k)$, $\dot{Y}_t(k)$ and $\dot{Z}_t(k)$ are the change rates of the theoretical value of the baseline vector at time k in three directions, satisfying:

$$\dot{X}_t(k) = \frac{X_t(k) - X_t(k-1)}{\tau},$$
$$\dot{Y}_t(k) = \frac{Y_t(k) - Y_t(k-1)}{\tau},$$
$$\dot{Z}_t(k) = \frac{Z_t(k) - Z_t(k-1)}{\tau},$$

wherein $\tau$ is a sampling interval of the receivers;

recording the measurement value $b_{ur}$ of the antenna baseline vector as:

$$b_m = b_{ur} = \begin{bmatrix} X_m \\ Y_m \\ Z_m \end{bmatrix},$$

wherein the change rate of the measurement value of the antenna baseline vector at epoch k is:

$$\dot{b}_m(k) = \begin{bmatrix} \dot{X}_m(k) \\ \dot{Y}_m(k) \\ \dot{Z}_m(k) \end{bmatrix},$$

wherein $X'_m(k)$, $Y'_m(k)$ and $Z'_m(k)$ are the change rates of the measurement value of the baseline vector in three directions at time k, and wherein the position domain error of the antenna baseline vector change rate in x, y and z directions at epoch k is expressed as:

$$\varepsilon_0 = \dot{b}_m - \dot{b}_t = \begin{bmatrix} \dot{X}_m - \dot{X}_t \\ \dot{Y}_m - \dot{Y}_t \\ \dot{Z}_m - \dot{Z}_t \end{bmatrix} = \begin{bmatrix} \varepsilon_x \\ \varepsilon_y \\ \varepsilon_z \end{bmatrix}.$$

Preferably, the position domain errors of the baseline vectors of multiple antennas are normalized as:

$$\tilde{\varepsilon}_i = \frac{\varepsilon_{0i}}{\delta_i},$$

wherein $\tilde{\varepsilon}_i$ is normalized value of the position domain errors, $\varepsilon_{0i}$ is the position domain error of the $i^{th}$ baseline before normalization, and $\delta_i$ is a coefficient factor;

wherein the normalized value of the position domain errors is square-normalized in three directions of x, y and z according to the following formulas:

$$Y_{nxi} = \left( \frac{\varepsilon_{xi} - \mu_{xi}}{\sigma_{xi}} \right)^2,$$

$$Y_{nyi} = \left( \frac{\varepsilon_{yi} - \mu_{yi}}{\sigma_{yi}} \right)^2,$$

$$Y_{nzi} = \left( \frac{\varepsilon_{zi} - \mu_{zi}}{\sigma_{zi}} \right)^2,$$

wherein the obtained square-normalized values $Y_{nxi}$, $Y_{nyi}$ and $Y_{nzi}$ are taken as cumulative sum algorithm input values of the $i^{th}$ antenna baseline vector in x, y and z directions, $\varepsilon_{xi}'$, $\varepsilon_{yi}'$ and $\varepsilon_{zi}'$ respectively represent the position domain errors of the $i^{th}$ baseline in x, y and z directions, $\mu_{xi}$, $\mu_{yi}$ and $\mu_{zi}$ respectively represent the mean values of the position domain errors of the $i^{th}$ baseline in x, y, and z directions, and, $\sigma_{xi}$, $\sigma_{yi}$ and $\sigma_{zi}$ respectively represent standard deviations of the position domain errors of the $i^{th}$ baseline in x, y, and z directions.

Preferably the cumulative sum is expressed as:

$$C_0^+ = \frac{H}{2},$$
$$C_n^+ = \max(0, C_{n-1}^+ + Y_n - k),$$

wherein $C_0^+$ represents a cumulative sum initial value at time 0, $C_n^+$ represents the cumulative sum at time n, $Y_n$ represents a cumulative sum input value, k represents a window factor related to the standard deviation, and H is an error monitoring threshold value.

Preferably, the error monitoring threshold value is obtained by the following steps:

dividing cumulative sum into M intervals with M+1 states from 0 to H;

calculating an ARL value as:

$$(I - P_R) \cdot W = I_1,$$

wherein $P_R'$ is a matrix after removing the last column and the last row of a matrix P, I is a unit matrix of (M+1) (M+1), W is a vector corresponding to the ARL value of the cumulative sum from state 0 to M, and an element in the middle is the ARL value corresponding to the cumulative sum starting from H/2; and presetting an error monitoring threshold value H, continuously iterating the ARL value until a calculated nominal ARL is equal to the reciprocal of the assigned integrity risk, and then inversely calculating the corresponding error monitoring threshold value.

Preferably, the window factor is calculated by the following formula:

$$k = \frac{\ln(\sigma_0)^2 - \ln(\sigma_1)^2}{(2\sigma_1^2)^{-1} - (2\sigma_0^2)^{-1}},$$

wherein $\sigma_0$ is a standard deviation under a normal condition and $\sigma_1$ is a standard deviation under an out-of-control condition to be detected.

Preferably, the cumulative sum is compared with the error monitoring threshold value as:

$$F_l = \begin{cases} 0, & ..C_n^+ < H \\ 1, & ..C_n^+ \geq H \end{cases},$$

wherein when cumulative sum exceeds the error monitoring threshold value, an integrity risk alarm is issued.

According to the dynamic baseline position domain monitoring method based on satellite navigation and inertial navigation provided by the present disclosure, under the condition that the initial position of the carrier, the initial value of the antenna baseline vector and the carrier displacement vector are known, the satellite navigation and inertial navigation observations are used for positioning and solving the antenna baseline vector on the dynamic carrier, and the cumulative sum algorithm is used for position domain monitoring of the antenna baseline vector. The error caused by vector position measurement of baseline between antennas can be reduced, the accuracy of protection level calculation can be improved, and the integrity risk during aircraft kinematical-to-kinematical approach and landing can be reduced, which is helpful to improve the performance of the kinematical-to-kinematical approach guidance system.

It should be understood that both the foregoing general description and the following detailed description are exemplary illustrations and explanations, and should not be used as limitations on what is claimed in the present disclosure.

BRIEF DESCRIPTION OF DRAWINGS

Further objects, functions and advantages of the present disclosure will be elucidated by the following description of embodiments of the present disclosure with reference to the accompanying drawings, in which.

DETAILED DESCRIPTION

Figure 1:
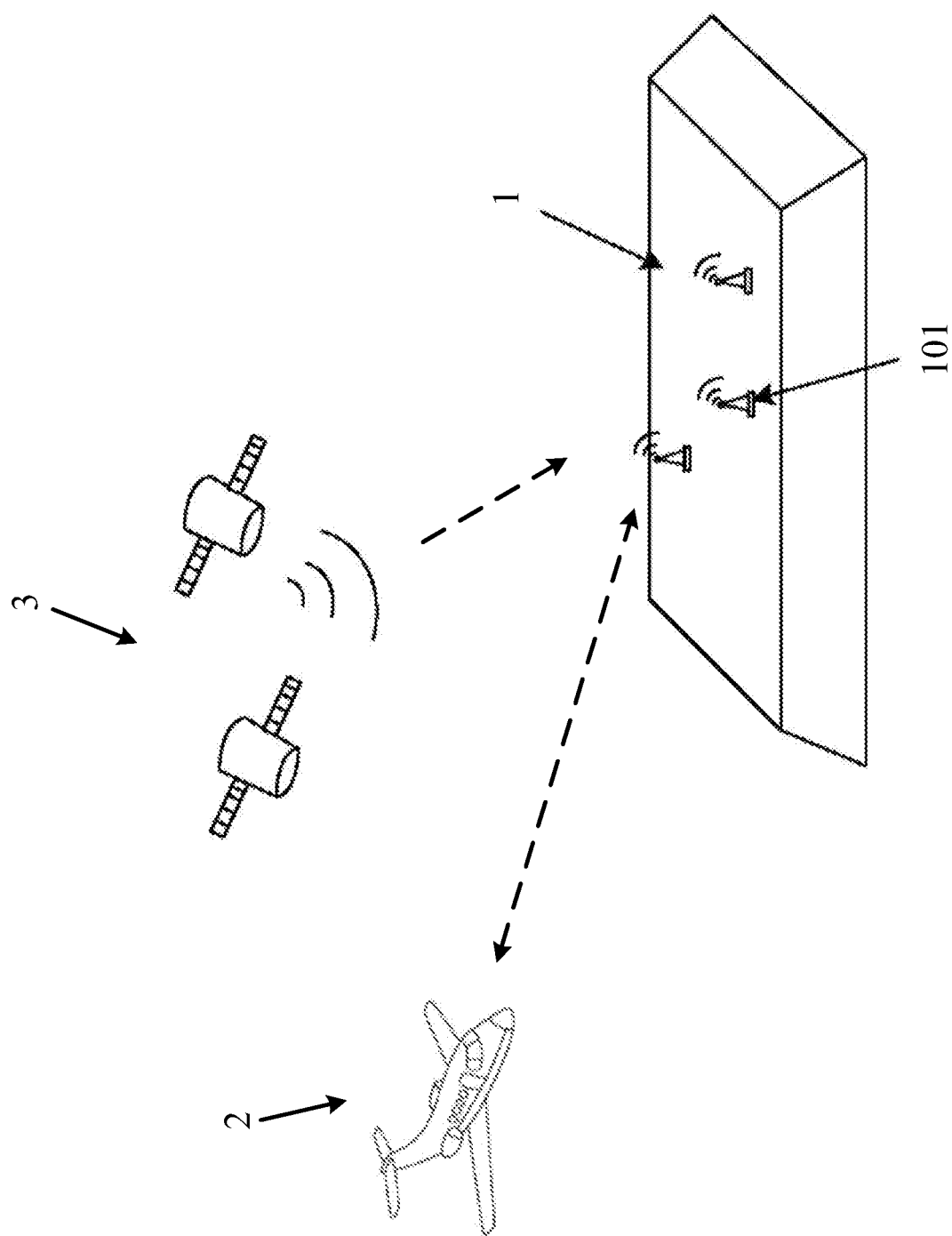
FIG. 1 shows a schematic diagram of a dynamic baseline position domain monitoring system based on satellite navigation and inertial navigation according to certain embodiments of the present disclosure.

By referring to exemplary embodiments, the objects and functions of the present disclosure and methods for achieving these objects and functions will be elucidated. However, the present disclosure is not limited to the exemplary embodiments disclosed below; it can be realized in different forms. The essence of the description is only to help those skilled in the art comprehensively understand the specific details of the disclosure.

Hereinafter, embodiments of the present disclosure will be described with reference to the drawings, and relevant technical terms should be well known to those skilled in the art. In the drawings, the same reference numerals refer to the same or similar components, or the same or similar steps, unless otherwise specified. The contents of the present disclosure will be described through specific embodiments. In order to solve the problems in the prior art that the accuracy of protection level calculation is low, and the integrity risk is high in kinematical-to-kinematical approach process during the moving process of the base station carrier caused by the position measurement errors generated by the vector of baseline between antennas.

As shown in FIG. 1, it is a schematic diagram of a dynamic baseline position domain monitoring system based on satellite navigation and inertial navigation of the present disclosure. According to an embodiment of the present disclosure, a dynamic baseline position domain monitoring system based on satellite navigation and inertial navigation includes: a carrier 1 and a plurality of base stations 101 arranged on the carrier 1. The base stations 101 move together with the carrier 1, and there are signal receiving antennas on the base stations 101 for receiving satellite signals. The base stations 101 are used to receive satellite signals, monitor a dynamic baseline position domain and guide a user terminal to land. A satellite 3 is used for transmitting satellite signals to the base stations 101 on the carrier 1. The user terminal 2 is used to receive a guidance signal sent by the carrier 1 and land according to the guidance signal.

Figure 2:
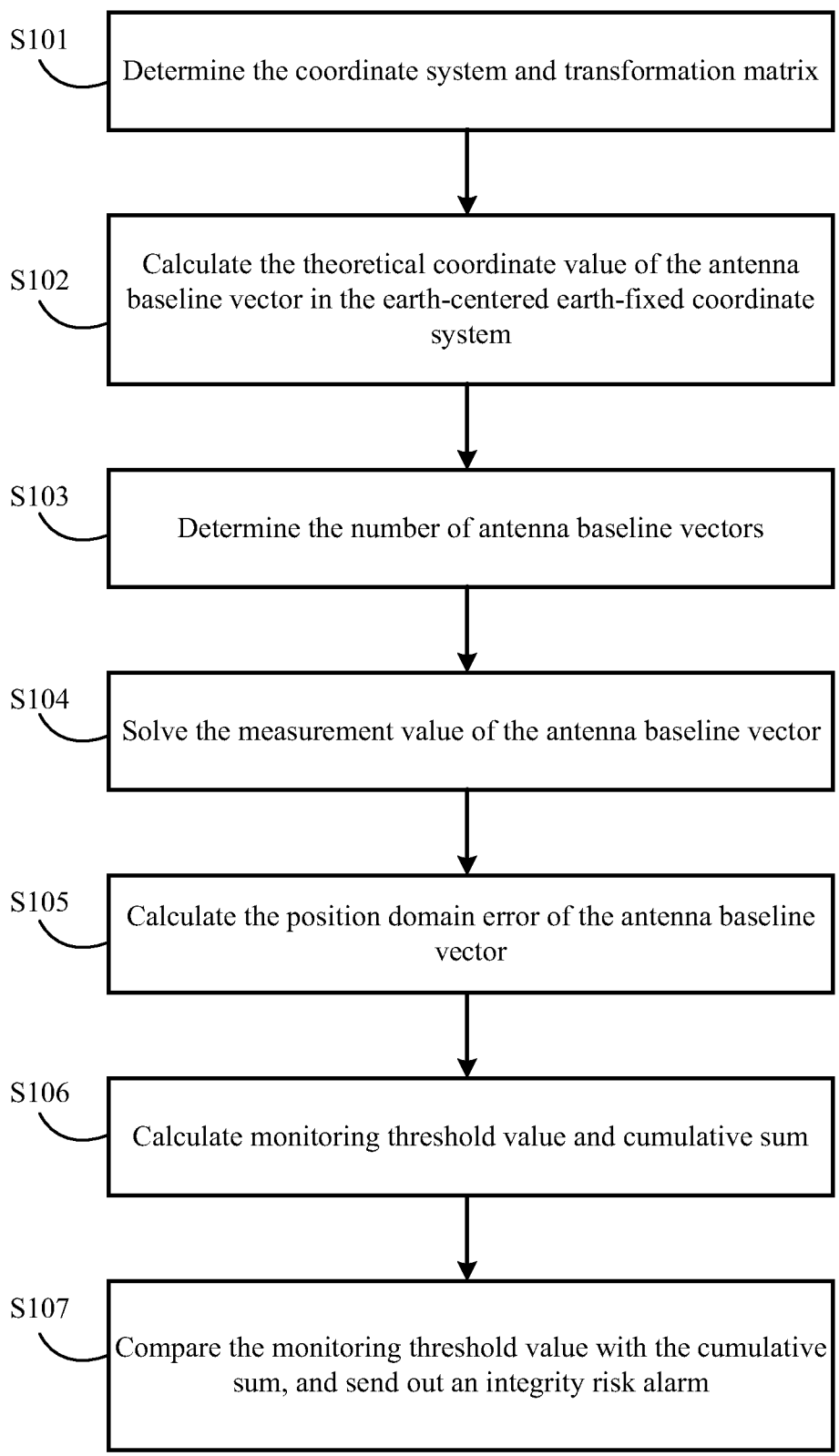
FIG. 2 shows a flowchart of a dynamic baseline position domain monitoring method based on satellite navigation and inertial navigation according to certain embodiments of the present disclosure.

According to the embodiment of the present invention, the carrier 1 (for example, an aircraft carrier) drives the base station 101 to move together during the movement, and the user terminal 2 (for example, an airplane) needs to land on the carrier 1. Because baseline vector errors will be generated for antennas of different base stations 101 due to movement with the carrier 1, the landing process of the user terminal 3 on the carrier 1 has a higher risk of integrity. As shown in FIG. 2, it is a flow chart of a method for monitoring a dynamic baseline position domain based on satellite navigation and inertial navigation according to the present disclosure. According to an embodiment of the present disclosure, the present disclosure provides a dynamic baseline position domain based on satellite navigation and inertial navigation. In the monitoring system, the base station receives satellite signals and performs dynamic baseline position domain monitoring by the following steps:

S101: determining a coordinate system and transformation matrixes.

According to the embodiment of the present disclosure, when the base station carrier (e.g., an aircraft carrier) moves and the base station moves together with the base station carrier, it is necessary to determine a coordinate system and transformation matrixes in order to solve the theoretical value of the antenna baseline vector.

According to an embodiment of the present invention, determining the coordinate system includes determining a topocentric coordinate system, a carrier coordinate system, an earth-centered earth-fixed rectangular coordinate system, a first transformation matrix between the topocentric coordinate system and the carrier coordinate system, and a second transformation matrix between the topocentric coordinate system and the earth-centered earth-fixed rectangular coordinate system.

The topocentric coordinate system is also known as a northeast sky coordinate system. For a carrier on the earth's surface with a small range of motion, its motion range is close to a plane, and as long as the displacement or velocity information of the carrier in the east and north directions can be obtained, the position of the carrier can be known accurately.

The topocentric coordinate system is defined as follows: the origin lies on the spherical surface of the local reference ellipsoid, the axis $X_L$ points to the east along the prime vertical circle direction of the reference ellipsoid, the axis $Y_L$ points to the north pole of the earth along the principle vertical circle direction of the reference ellipsoid, and the axis $Z_L$ points to the zenith along the exterior normal direction of the ellipsoid.

In the present disclosure, the origin of the topocentric coordinate system is the centroid position when the carrier is in the initial position, and the topocentric coordinate system is expressed as: $[X_L Y_L Z_L]^T$.

A coordinate system centered on the carrier and fixed on the carrier is called a carrier coordinate system. The origin of the carrier coordinate system is located at the centroid of the carrier, the axis $Y_b$ points to the longitudinal axis of the carrier, the axis $Z_b$ goes up along the vertical axis of the carrier, and axes $X_b$, $Y_b$ and $Z_b$ form a right-hand coordinate system. The carrier coordinate system is expressed as: $[X_b Y_b Z_b]^T$.

With the center of the earth as the origin of a coordinate, the z-axis points to the north pole of the earth, the x-axis points to an intersection point between the reference meridian plane (usually Greenwich meridian plane) and the earth equator, and the Y-axis, X-axis and Z-axis together form a right-hand rectangular coordinate system, which becomes the earth-centered earth-fixed coordinate system expressed as: $[X_e Y_e Z_e]^T$.

According to an embodiment of the present disclosure, the carrier coordinate system $[X_b Y_b Z_b]^T$ is transformed into a topocentric coordinate system $[X_L Y_L Z_L]^T$, and a transformation between the topocentric coordinate system and the carrier coordinate system is:

$$\begin{bmatrix} X_L \\ Y_L \\ Z_L \end{bmatrix} = \begin{bmatrix} X_{0L} \\ Y_{0L} \\ Z_{0L} \end{bmatrix} + R \begin{bmatrix} X_b \\ Y_b \\ Z_b \end{bmatrix},$$

where R is the first transformation matrix, $[X_{0L} Y_{0L} Z_{0L}]^T$ is a topocentric coordinate of the carrier, and R satisfies:

$$R = \begin{bmatrix} \cos r \cdot \cos y - \sin r \cdot \sin p \cdot \sin y & -\sin y \cdot \cos p & \sin r \cdot \cos y + \sin p \cdot \sin y \cdot \cos r \\ \sin y \cdot \cos r + \sin r \cdot \sin p \cdot \cos y & \cos p \cdot \cos y & \sin r \cdot \sin y - \sin p \cdot \cos r \cdot \cos y \\ -\sin r \cdot \cos p & \sin p & \cos r \cdot \cos p \end{bmatrix}$$

where p, r and y are a pitch angle, a roll angle and a heading angle of the carrier respectively.

According to an embodiment of the present disclosure, a topocentric coordinate system $[X_L Y_L Z_L]^T$ is transformed into an earth-centered earth-fixed coordinate system $[X_e Y_e Z_e]^T$, and the transformation between the topocentric coordinate system and the earth-centered earth-fixed coordinate system is:

$$\begin{bmatrix} X_e \\ Y_e \\ Z_e \end{bmatrix} = \begin{bmatrix} X_{0e} \\ Y_{0e} \\ Z_{0e} \end{bmatrix} + R_L^e \begin{bmatrix} X_L \\ Y_L \\ Z_L \end{bmatrix},$$

where $R_L^e$ is the second transformation matrix, $[X_{0e} Y_{0e} Z_{0e}]^T$ is an earth-centered earth-fixed coordinate of a topocentric origin, and $R_L^e$ satisfies:

$$R_L^e = \begin{Bmatrix} -\sin\theta & -\cos\theta \cdot \sin\varphi & \cos\theta \cdot \cos\varphi \\ \cos\theta & -\sin\theta \cdot \cos\varphi & \sin\theta \cdot \cos\varphi \\ 0 & \cos\varphi & \sin\varphi \end{Bmatrix},$$

where θ and φ are the longitude and latitude of the carrier respectively.

Step S102: calculating the theoretical coordinate value of the antenna baseline vector in the earth-centered earth-fixed coordinate system.

Figure 3:
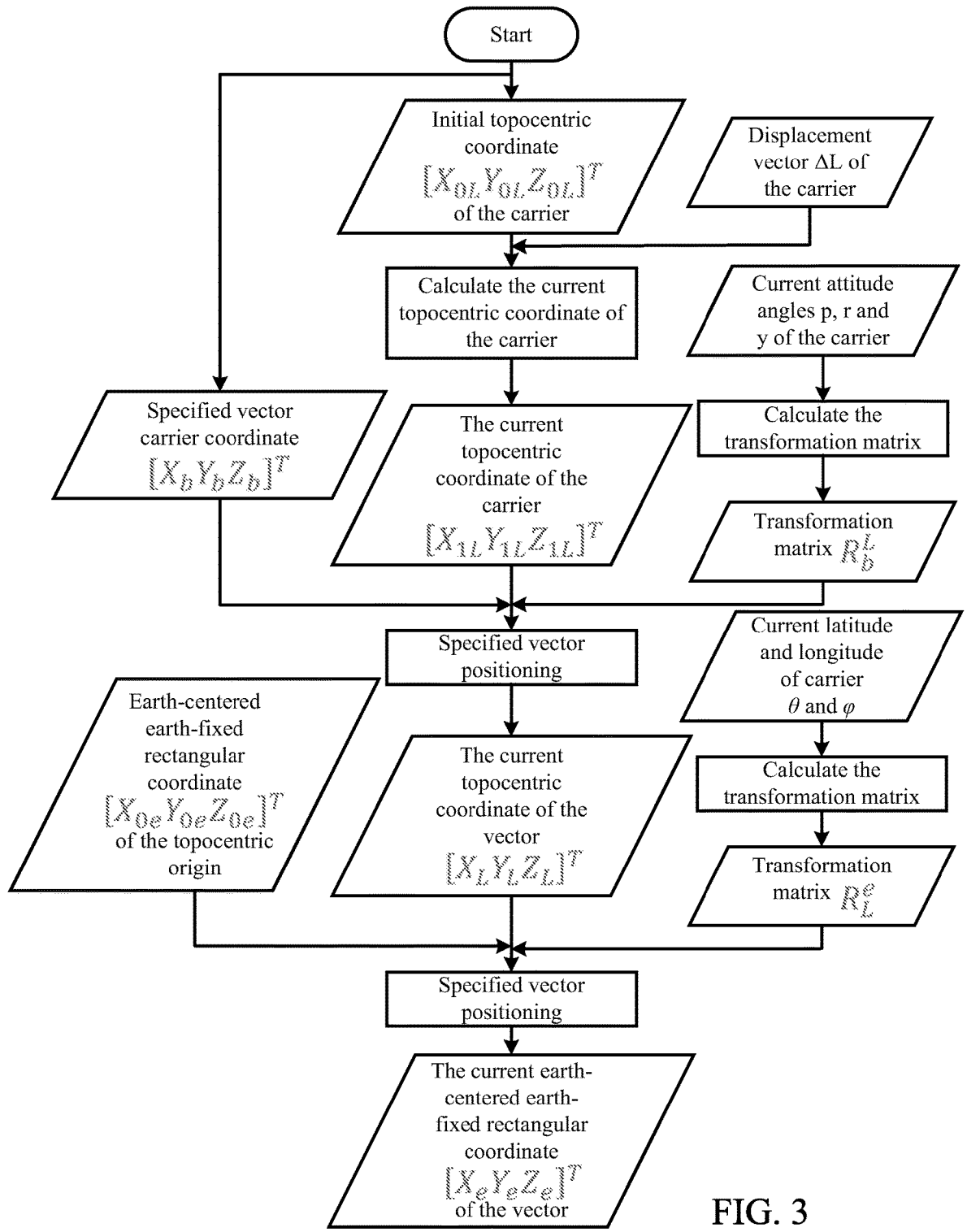
FIG. 3 shows the flowchart of solving the theoretical coordinate value of the antenna baseline vector in the earth-centered earth-fixed coordinate system according to certain embodiments of the present disclosure.

According to the embodiment of the preset disclosure, the theoretical coordinate value of the antenna baseline vector in the earth-centered earth-fixed coordinate system during the movement of the base station carrier is calculated. As shown in FIG. 3, it is a flow chart of solving the coordinate theoretical value of the antenna baseline vector in the earth-centered earth-fixed coordinate system of the present disclosure.

The base station carrier moves from the initial position (the coordinate $[X_{0L} Y_{0L} Z_{0L}]^T$ of the initial position of the base station carrier in the topocentric coordinate system) to the current position (the coordinate $[X_{1L} Y_{1L} Z_{1L}]^T$ of the current position of the base station carrier in the topocentric coordinate system), and the attitude of the carrier (pitch angle, roll angle and heading angle) also changes.

For the calculation of theoretical values, if the carrier is a rigid body, which will not be deformed by bending or stretching, then the antenna baseline vector is stationary relative to the base station carrier, that is, the carrier coordinates of the antenna baseline vector are unchanged, so the carrier coordinates of the antenna baseline vector are both $[X_b Y_b Z_b]^T$ before and after displacement.

The current topocentric coordinate of the carrier is calculated through the carrier displacement vector ΔL:

$$\begin{bmatrix} X_{1L} \\ Y_{1L} \\ Z_{1L} \end{bmatrix} = \begin{bmatrix} X_{0L} \\ Y_{0L} \\ Z_{0L} \end{bmatrix} + \Delta L.$$

During the movement of the carrier and the base stations, the theoretical coordinate value of the antenna baseline vector in the earth-centered earth-fixed coordinate system is calculated by the following formula:

$$\begin{bmatrix} X'_e \\ Y'_e \\ Z'_e \end{bmatrix} = \begin{bmatrix} X_{0e} \\ Y_{0e} \\ Z_{0e} \end{bmatrix} + R^e_L \begin{bmatrix} X'_L \\ Y'_L \\ Z'_L \end{bmatrix},$$

where $R^e_L$ is the second transformation matrix, $[X'_e Y'_e Z'_e]^T$ is the theoretical coordinate value of the antenna baseline vector in the earth-centered earth-fixed coordinate system, $[X_{0e}\ Y_{0e}\ Z_{0e}]^T$ is the earth-centered earth-fixed coordinate of the topocentric origin, $[X'_L Y'_L Z'_L]^T$ is the coordinate of the antenna baseline vector in the topocentric coordinate system.

The coordinate $[X'_L Y'_L Z'_L]^T$ of the antenna baseline vector in the topocentric coordinate system satisfies:

$$\begin{bmatrix} X'_L \\ Y'_L \\ Z'_L \end{bmatrix} = \begin{bmatrix} X_{1L} \\ Y_{1L} \\ Z_{1L} \end{bmatrix} + R\begin{bmatrix} X_b \\ Y_b \\ Z_b \end{bmatrix} = \begin{bmatrix} X_{0L} \\ Y_{0L} \\ Z_{0L} \end{bmatrix} + \Delta L + R\begin{bmatrix} X_b \\ Y_b \\ Z_b \end{bmatrix},$$

wherein, $[X_b Y_b Z_b]^T$ is the coordinate of the carrier of the base stations in the carrier coordinate system, R is the first transformation matrix, $\Delta L$ is a displacement vector of the carrier of the base stations moving from an initial position to a current position, $[X_{0L} Y_{0L} Z_{0L}]^T$ is the coordinate of the initial position of the carrier of the base stations in the topocentric coordinate system, and $[X_{1L} Y_{1L} Z_{1L}]^T$ is the coordinate of the current position of the carrier of the base stations in the topocentric coordinate system.

S103: Determining the number of antenna calculation vectors.

According to the base stations arranged on the carrier, pseudo-users are combined with reference stations, and the number of antenna baseline vectors to be monitored is determined.

Figure 4:
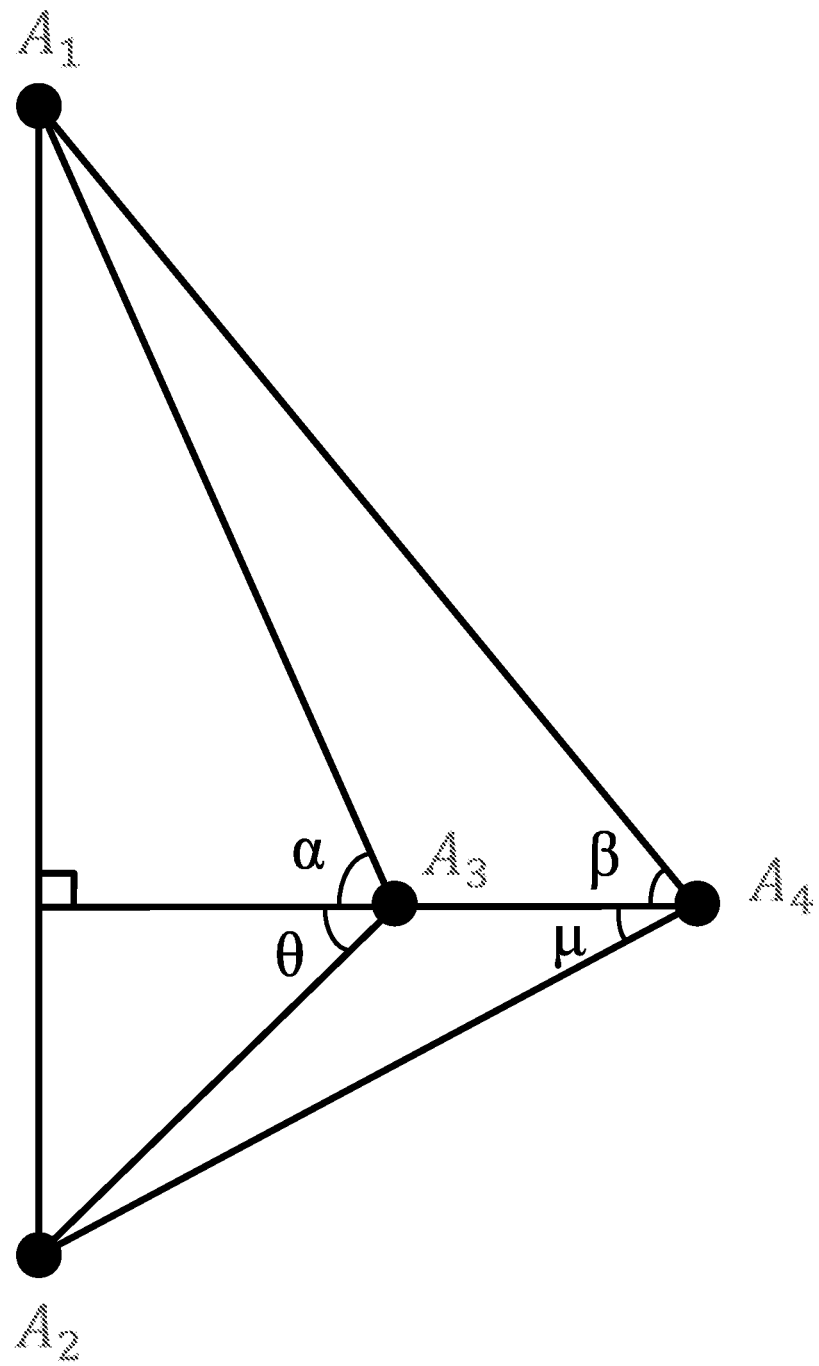
FIG. 4 shows a schematic diagram of the location distribution of base station antennas on a carrier according to an embodiment of the present disclosure.

According to an embodiment of the present disclosure, there are four base stations on the base station carrier, and each base station has an antenna. FIG. 4 shows a schematic diagram of the position distribution of the base station antennas on the carrier in an embodiment of the present disclosure, and the distribution and angular relationship among the four antennas A1, A2, A3 and A4 constitute a total of six antenna baselines.

Each antenna can be regarded as a pseudo-user (auxiliary antenna) of other antennas, so if each antenna is regarded as a pseudo-user and other antennas are regarded as reference stations, a total of 12 antenna baseline vectors need to be calculated and monitored. Actually, there are repeated vectors. In order to reduce the calculation time, the combination sequence of these four reference antennas is specified in the embodiment of the present disclosure.

(1) the antenna A1 acts as a false user, and the antenna A2 acts as a reference station;
(2) the antenna A1 acts as a false user and the antenna A3 acts as a reference station;
(3) the antenna A1 acts as a false user and antenna A4 as a reference station;
(4) the antenna A2 acts as a false user, and the antenna A3 acts as a reference station;
(5) the antenna A2 acts as a false user, and antenna A4 acts as a reference station; and
(6) the antenna A3 acts as a false user, and antenna A4 acts as a reference station.

According to the above regulations, only 6 antenna baseline vectors need to be calculated and monitored to avoid wasting the calculation amount.

Step S104: solving the measurement value of the antenna baseline vector

According to an embodiment of the present disclosure, the measurement value of the antenna baseline vector is solved by using a dual-carrier phase measurement value of the pseudo user and a reference station for the satellite.

According to an embodiment of the present disclosure, solving the measurement value of the antenna baseline vector by using a dual-carrier phase measurement value of the pseudo user and a reference station for the satellite comprises the following method steps:

Step 201, determining a carrier phase measurement value of the pseudo user u for the satellite i as:

$$\varnothing_u^{(i)} = \lambda^{-1} \cdot [r_u^{(i)} + c \cdot (\delta t_u - \delta t^{(i)}) - I_u^{(i)} + T_u^{(i)}] + N_u^{(i)} + \varepsilon_{\varnothing,u}^{(i)},$$

where $\varnothing_u^{(i)}$ is the carrier phase measurement value of the satellite i by the pseudo user u, $\lambda$ is a wavelength, $r_u^{(i)}$ is a geometric distance between the pseudo user u and satellite i, c is speed of light, $\delta t_u$ is a pseudo user receiver clock error, $\delta t^{(i)}$ is a satellite clock error, $I_u^{(i)}$ is an ionospheric delay, $T_u^{(i)}$ is a tropospheric delay, $N_u^{(i)}$ is a pseudo user integer ambiguity, and $\varepsilon_{\varnothing,u}^{(i)}$ is a pseudo user carrier phase measurement noise.

The method for the carrier phase measurement value of the reference station r for the satellite i is the same as that for the carrier phase measurement value of the pseudo user u for the satellite i, and thus will not described again.

Step 202: determining a single difference carrier phase measurement value of the pseudo user u and the reference station r for the satellite i as:

$$\varnothing_{ur}^{(i)} = \varnothing_u^{(i)} - \varnothing_r^{(i)} = \lambda^{-1} \cdot r_{ur}^{(i)} + f \cdot \delta t_{ur} + N_{ur}^{(i)} + \varepsilon_{\varnothing,ur}^{(i)},$$

where $\varnothing_{ur}^{(i)}$ is the single difference carrier phase measurement value of the pseudo user u and reference station r for the satellite i, $\varnothing_u^{(i)}$ is a carrier phase measurement value of the pseudo user u for the satellite i, $\varnothing_r^{(i)}$ is a carrier phase measurement value of the reference station r for the satellite i, $\lambda$ is the wavelength, $r_{ur}^{(i)}$ is a single difference of the geometric distance between the pseudo user u and the satellite i, and the geometric distance between the reference station r and satellite i, f is a carrier frequency, $\delta t_{ur}$ is a single difference between the pseudo user receiver clock error and a reference station receiver clock error, $\varepsilon_{\varnothing,ur}^{(i)}$ is a single difference between the pseudo user integer ambiguity and a reference station integer ambiguity, $\varepsilon_{\varnothing,ur}^{(i)}$ is a single difference between the pseudo user carrier phase measurement noise and a reference station carrier phase measurement noise.

The method for the single difference carrier phase measurement value of the pseudo user u and the reference station r for the satellite j is the same as that for the single difference carrier phase measurement value of the pseudo user u and the reference station r for the satellite i, and thus will not described again.

Step 203: determining a double difference carrier phase measurement value of the pseudo user u and the reference station r for the satellites i and j as:

$$\varnothing_{ur}^{(ij)} = \varnothing_{ur}^{(i)} - \varnothing_{ur}^{(j)} = \lambda^{-1} r_{ur}^{(ij)} + N_{ur}^{(ij)} + \varepsilon_{\varnothing,ur}^{(ij)},$$

where $\varnothing_{ur}^{(ij)}$ is the double difference carrier phase measurement value of the pseudo user u and the reference station r for the satellite i and satellite j, $\varnothing_{ur}^{(i)}$ is the single difference carrier phase measurement value of the pseudo user u and the reference station r for the satellite $\varnothing_{ur}^{(j)}$ is a single difference carrier phase measurement value of the pseudo user u and the reference station r for the satellite j, and k is the wavelength, $r_{ur}^{(ij)}$ is a double difference of the geometric distances between the pseudo user u and the reference station r and satellite i and satellite j, $N_{ur}^{(ij)}$ is a double difference between the pseudo user integer ambiguity and the reference station integer ambiguity, and $\varepsilon_{\emptyset,\ ur}^{(ij)}$ is a double difference between the pseudo user carrier phase measurement noise and reference station carrier phase measurement noise.

Step 204: solving the measurement value of the antenna baseline vector as:

$$r_{ur}^{(i)} = -b_{ur} \cdot l^{(i)},$$

where $b_{ur}$ is a measurement value of the antenna baseline vector between the two receivers of the pseudo user and the reference station, $l^{(i)}$ is an observation direction unit vector of the receiver for the satellite i, and $r_{ur}^{(i)}$ is a single difference geometric distance from the pseudo user u and the reference station r to the satellite i.

A double difference geometric distance from the pseudo user u and the reference station r to satellites i and j is as follows:

$$r_{ur}^{(j)} = -b_{ur} \cdot l^{(j)},$$

where $l^{(j)}$ is an observation direction unit vector of the receivers for the satellite j.

The double difference geometric distance from the pseudo user u and the reference station r to the satellites i and j is substituted into the double difference carrier phase measurement value of the pseudo user u and the reference station r for the satellites i and j:

$$r_{ur}^{(ij)} = -b_{ur} \cdot l^{(i)} + b_{ur} \cdot l^{(j)} = -(l^{(i)} - l^{(j)}) \cdot b_{ur},$$

The pseudo user u and the reference station r simultaneously observe M satellites and obtain M−1 mutually independent double difference carrier phase measurement values, which are written in the following matrix form:

$$\begin{bmatrix} \phi_{ur}^{(21)} \\ \phi_{ur}^{(31)} \\ \ldots \\ \phi_{ur}^{(M1)} \end{bmatrix} = \lambda^{-1}, \begin{bmatrix} -(l^{(2)} - l^{(1)})^T \\ -(l^{(3)} - l^{(1)})^T \\ \ldots \\ -(l^{(M)} - l^{(1)})^T \end{bmatrix} \cdot b_{ur} + \begin{bmatrix} N_{ur}^{(21)} \\ N_{ur}^{(31)} \\ \ldots \\ N_{ur}^{(M1)} \end{bmatrix},$$

The double difference measurement noise is ignored in the present embodiment, and when the double difference carrier phase measurement value is known, a LAMBDA algorithm is used to solve the integer ambiguity, and a double difference integer ambiguity is calculated to solve the measurement value $b_{ur}$ of the antenna baseline vector.

Step 105: calculating the position domain error of the antenna baseline vector.

A position domain error of an antenna baseline vector change rate in three directions of x, y and z at epoch k is obtained according to the theoretical coordinate value of the antenna baseline vector in the earth-centered earth-fixed coordinate system and the measurement value of the antenna baseline vector, and the position domain error is normalized to obtain a normalized value of the position domain error.

The errors in antenna baseline position domain include inertial navigation errors accumulated over time. If the inertial navigation system is not corrected, the overall errors of the baseline vectors relative to the initial time that are directly monitored are not accurate. The position domain errors of the change rates between two adjacent times for the antenna baseline vector are monitored.

According to the embodiment of the present disclosure, the position domain error of the antenna baseline vector change rate in x, y and Z directions at epoch K is calculated as follows:

recording the theoretical coordinate value $[X_e'Y_e'Z_e']^T$ of the antenna baseline vector in the earth-centered earth-fixed coordinate system as:

$$b_t = \begin{bmatrix} X_e' \\ Y_e' \\ Z_e' \end{bmatrix} = \begin{bmatrix} X_t \\ Y_t \\ Z_t \end{bmatrix},$$

then the change rate of a theoretical value of the antenna baseline vector at epoch k is:

$$\dot{b}_t(k) + \begin{bmatrix} \dot{X}_t(k) \\ \dot{Y}_t(k) \\ \dot{Z}_t(k) \end{bmatrix},$$

where $\dot{X}_t(k)$, $\dot{Y}_t(k)$ and $\dot{Z}_t(k)$ are the change rates of the theoretical value of the baseline vector at time k in three directions, satisfying:

$$\dot{X}_t(k) = \frac{X_t(k) - X_t(k-1)}{\tau},$$

$$\dot{Y}_t(k) = \frac{Y_t(k) - Y_t(k-1)}{\tau},$$

$$\dot{Z}_t(k) = \frac{Z_t(k) - Z_t(k-1)}{\tau},$$

where $\tau$ is a sampling interval of the receivers;

recording the measurement value $b_{ur}$ of the antenna baseline vector as:

$$b_m = b_{ur} = \begin{bmatrix} X_m \\ Y_m \\ Z_m \end{bmatrix},$$

where the change rate of the measurement value of the antenna baseline vector at epoch k is:

$$\dot{b}_m(k) = \begin{bmatrix} \dot{X}_m(k) \\ \dot{Y}_m(k) \\ \dot{Z}_m(k) \end{bmatrix},$$

where $X'_m(k)$ $Y'_m(k)$ and $Z'_m(k)$ are the change rates of the measurement value of the baseline vector in three directions at time k, and the position domain error of the antenna baseline vector change rate in x, y and z directions at epoch k is expressed as:

$$\dot{\varepsilon}_0 = \dot{b}_m - \dot{b}_t = \begin{bmatrix} \dot{X}_m - \dot{X}_t \\ \dot{Y}_m - \dot{Y}_t \\ \dot{Z}_m - \dot{Z}_t \end{bmatrix} = \begin{bmatrix} \dot{\varepsilon}_x \\ \dot{\varepsilon}_y \\ \dot{\varepsilon}_z \end{bmatrix}.$$

The position domain errors of the baseline vectors of multiple antennas are normalized. In this embodiment, the solution and monitoring sequence of six antenna baselines is specified. Since the baseline position domain error is proportional to the baseline length, the monitoring threshold value of each baseline will also be related to the baseline length itself. Therefore, in order to use a unified monitoring threshold value, it is necessary to normalize the position domain error first.

The length relationship between six baselines can be obtained from the geometric relationship of antenna distribution:

$$\overline{A_1A_2} = \frac{\sin\theta \cdot \cos\alpha + \sin\alpha \cdot \cos\theta}{\cos\theta} \cdot \overline{A_1A_3} = \delta_1 \cdot \overline{A_1A_3},$$

$$\overline{A_1A_3} = 1 \cdot \overline{A_1A_3} = \delta_2 \cdot \overline{A_1A_3},$$

$$\overline{A_1A_4} = \frac{\sin\alpha}{\sin\beta} \cdot \overline{A_1A_3} = \delta_3 \cdot \overline{A_1A_3},$$

$$\overline{A_2A_3} = \frac{\cos\alpha}{\cos\theta} \cdot \overline{A_1A_3} = \delta_4 \cdot \overline{A_1A_3},$$

$$\overline{A_2A_4} = \frac{\cos\beta\sin\alpha}{\cos\mu\sin\beta} \cdot \overline{A_1A_3} = \delta_5 \cdot \overline{A_1A_3},$$

$$\overline{A_3A_4} = \frac{\sin\alpha \cdot \cos\beta - \cos\alpha \cdot \sin\beta}{\sin\beta} \cdot \overline{A_1A_3} = \delta_6 \cdot \overline{A_1A_3},$$

the position domain errors of the baseline vectors of six antennas are normalized:

$$\dot{\varepsilon}_i = \frac{\varepsilon_{0i}}{\delta_i},$$

where $\dot{\varepsilon}_i$ is normalized value of the position domain errors, $\varepsilon_{0i}$ is the position domain error of the $i^{th}$ baseline before normalization, and $\delta_i$ is a coefficient factor.

Because the deformation range of the carrier such as bending or stretching is limited and the change is slow, the positioning errors monitored in the position domain monitoring are small, lasting and slow values, so the cumulative sum algorithm CUSUM is introduced to monitor the position domain of the antenna baseline.

According to the embodiment of the present disclosure, the normalized value of the position domain error is subjected to square normalization in three directions of i.e., x, y, and z, as the input value of the cumulative sum algorithm.

According to the embodiment of the present disclosure, the normalized value of the position domain errors is square-normalized in three directions of x, y and z according to the following formulas:

$$Y_{nxi} = \left(\frac{\varepsilon_{xi} - \mu_{xi}}{\sigma_{xi}}\right)^2,$$

$$Y_{nyi} = \left(\frac{\varepsilon_{yi} - \mu_{yi}}{\sigma_{yi}}\right)^2,$$

$$Y_{nzi} = \left(\frac{\varepsilon_{zi} - \mu_{zi}}{\sigma_{zi}}\right)^2,$$

where the obtained square-normalized values $Y_{nxi}$, $Y_{nyi}$ and $Y_{nzi}$ are taken as cumulative sum algorithm input values of the $i^{th}$ antenna baseline vector in x, y and z directions, $\varepsilon_{xi}'$, $\varepsilon_{yi}'$ and $\varepsilon_{zi}'$ respectively represent the position domain errors of the $i^{th}$ baseline in x, y and z directions, $\mu_{xi}$, $\mu_{yi}$ and $\mu_{zi}$ respectively represent the mean values of the position domain errors of the $i^{th}$ baseline in x, y, and z directions, and, $\sigma_{xi}$, $\sigma_{yi}$ and $\sigma_{zi}$ respectively represent standard deviations of the position domain errors of the $i^{th}$ baseline in x, y, and z directions.

Step 106: calculating the monitoring threshold value and the cumulative sum.

The error monitoring threshold value of the antenna baseline vector is calculated, and the normalized value of the position domain error is subjected to square normalization in X, Y and Z directions, and the obtained square normalized value is input into the cumulative sum algorithm to obtain the cumulative sum.

According to the embodiment of the present disclosure, the threshold value H is determined according to the expected average chain length ARL and k value, and is calculated by performing numerical search on the Markov chain model of CUSUM.

The cumulative sum is divided into M intervals from 0 to H, with a total of M+1 states. If these M+1 states are added to all possible CUSUM values exceeding hH, there are M+2 states in total. A CUSUM state distribution at epoch k depends only on its state at the previous epoch k−1 and the distribution of incremental values at k. For the baseline positioning error of Gaussian distribution in a nominal state, a transformation matrix P of (M+2)(M+2) can be deduced, in which elements Pi,j and j are the transformation probabilities from state i to j. The ARL value is calculated using the following formula:

$$(I-P_R) \cdot W = I_1,$$

where $P_R$ is a matrix after removing the last column and the last row of a matrix P, I is a unit matrix of (M+1) (M+1), W is a vector corresponding to the ARL value of the cumulative sum from state 0 to M, and an element in the middle is the ARL value corresponding to the cumulative sum starting from H/2.

The window factor is calculated by the following method:

$$k = -\frac{\ln(\sigma_0)^2 - \ln(\sigma_1)^2}{(2\sigma_1^2)^{-1} - (2\sigma_0^2)^{-1}},$$

where $\sigma_0$ is a standard deviation under a normal condition and $\sigma_1$ is a standard deviation under an out-of-control condition to be detected.

The error monitoring threshold value is obtained by the following step:

presetting an error monitoring threshold value H, continuously iterating the ARL value until a calculated nominal ARL is equal to the reciprocal of the assigned integrity risk, and then inversely calculating the corresponding error monitoring threshold value.

The cumulative sum is expressed as:

$$C_0^+ = \frac{H}{2},$$
$$C_n^+ = \max(0, C_{n-1}^+ + Y_n - k),$$

where $c_0^+$ represents a cumulative sum initial value at time 0, $C_n^+$ represents the cumulative sum at time n, $Y_n$ represents a cumulative sum input value, k represents a window factor related to the standard deviation, and H is an error monitoring threshold value.

Step S107: comparing the cumulative sum with the error monitoring threshold value, and issuing an integrity risk alarm. The cumulative sum is compared with the error monitoring threshold value, and when the cumulative sum exceeds the error monitoring threshold value, an integrity risk alarm is issued.

Figure 5:
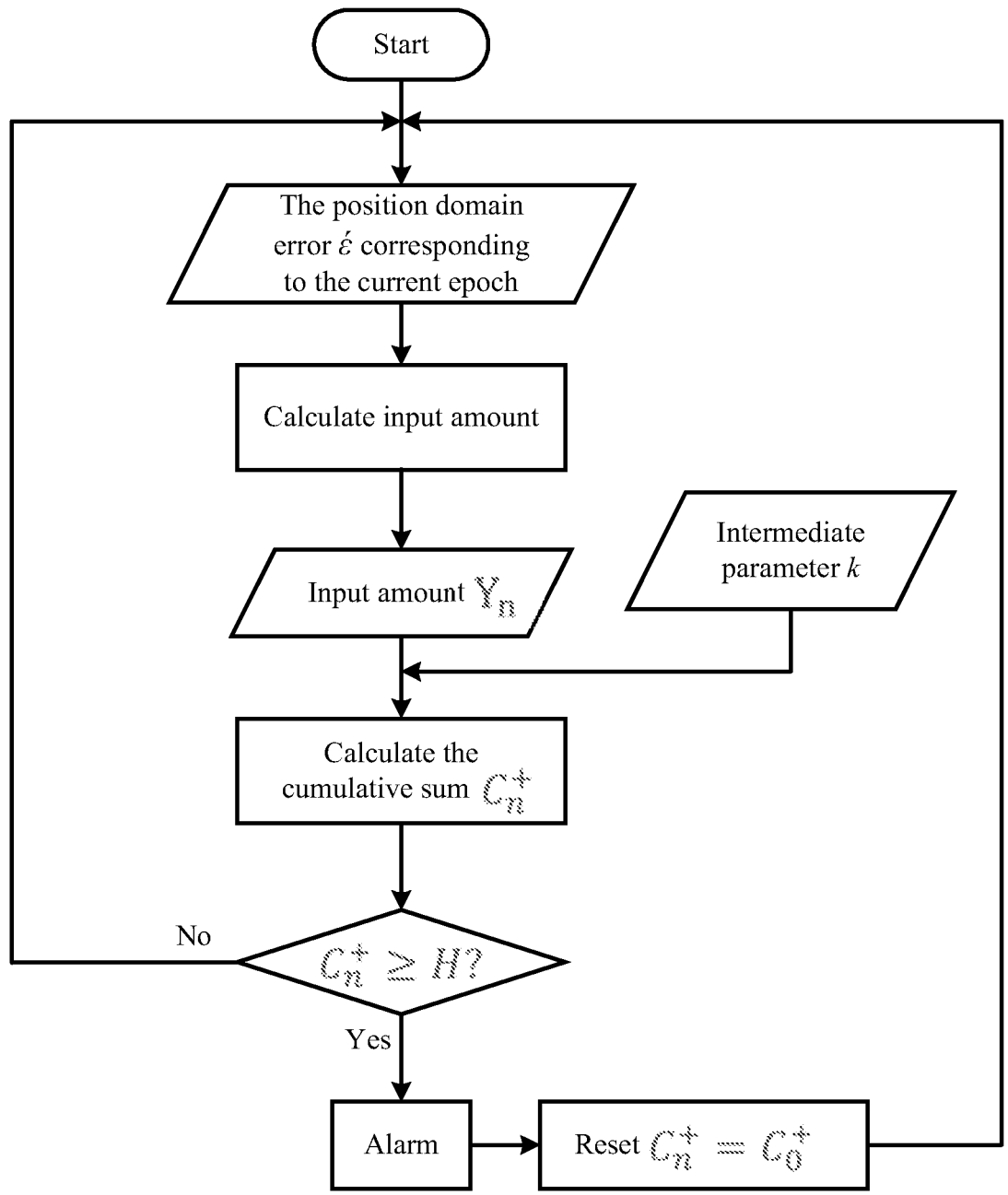
FIG. 5 shows the flowchart of the integrity risk alarm issued by the cumulative sum algorithm according to certain embodiments.

FIG. 5 shows the flow chart of issuing an integrity risk alarm through a cumulative sum algorithm; the cumulative sum is compared with error monitoring threshold:

$$F_l = \begin{cases} 0, -C_n^+ < H \\ 1, -C_n^+ \geq H \end{cases},$$

when cumulative sum exceeds the error monitoring threshold value, an integrity risk alarm is issued.

In this embodiment, there are 6 antenna baselines, and the cumulative sum input value of each antenna baseline of the 6 antenna baselines is input into the cumulative sum algorithm, and as long as the change rate error of one baseline exceeds the monitoring threshold value, the system will give an alarm.

According to the dynamic baseline position domain monitoring method based on satellite navigation and inertial navigation provided by the present disclosure, under the condition that the initial position of the carrier, the initial value of the antenna baseline vector and the carrier displacement vector are known, the satellite navigation and inertial navigation observations are used for positioning and solving the antenna baseline vector on the dynamic carrier, and the cumulative sum algorithm is used for position domain monitoring of the antenna baseline vector. The error caused by vector position measurement of baseline between antennas can be reduced, the accuracy of protection level calculation can be improved, and the integrity risk during aircraft kinematical-to-kinematical approach and landing can be reduced, which is helpful to improve the performance of the kinematical-to-kinematical approach guidance system.

Combined with the description and practice of the disclosure disclosed herein, other embodiments of the present disclosure are easy to think of and understand for those skilled in the art. The description and the embodiment are only considered to be exemplary, and the true scope and subject matter of the present disclosure are defined by the claims.

What is claimed is:

1. A dynamic baseline position domain monitoring system based on satellite navigation and inertial navigation, comprising:
a carrier;
a user terminal configured to receive a guidance signal sent by the carrier and land according to the guidance signal;
a plurality of base stations arranged on the carrier, wherein the base stations and the carrier are configured to move together, and the base stations are configured to receive satellite signals, monitor a dynamic baseline position domain and guide the user terminal to land;
a satellite configured to transmit the satellite signals to the base stations on the carrier; and
wherein the base stations are configured to receive the satellite signals and monitor the dynamic baseline position domain by the following steps:
a) determining a topocentric coordinate system, a carrier coordinate system, an earth-centered earth-fixed rectangular coordinate system, a first transformation matrix between the topocentric coordinate system and the carrier coordinate system, and a second transformation matrix between the topocentric coordinate system and the earth-centered earth-fixed rectangular coordinate system;
b) calculating a theoretical coordinate value of an antenna baseline vector in the earth-centered earth-fixed coordinate system during movement of the carrier and the base stations;
c) combining a pseudo user with reference stations according to the base stations arranged on the carrier, and determining a number of antenna baseline vectors to be monitored;
d) solving a measurement value of the antenna baseline vector by using a dual-carrier phase measurement values of the pseudo user and a reference station for the satellite;
e) obtaining a position domain error of an antenna baseline vector change rate in three directions of x, y and z at epoch k according to the theoretical coordinate value of the antenna baseline vector in the earth-centered earth-fixed coordinate system and the measurement value of the antenna baseline vector, and normalizing the position domain error to obtain a normalized value of the position domain error;
f) calculating an error monitoring threshold value of the antenna baseline vector, performing square normalization processing on the normalized value of the position domain error in three directions of x, y and z, and inputting an obtained square normalized value into a cumulative sum algorithm to obtain a cumulative sum; and
g) comparing the cumulative sum with the error monitoring threshold value, and when the cumulative sum exceeds the error monitoring threshold value, issuing an integrity risk alarm.

2. The system according to claim 1, wherein the topocentric coordinate system is expressed as: $[X_L \ Y_L \ Z_L]^T$, the carrier coordinate system is expressed as: $[X_b \ Y_b \ Z_b]^T$, and the earth-centered earth-fixed coordinate system is expressed as: $[X_e \ Y_e \ Z_e]^T$,
wherein a transformation between the topocentric coordinate system and the carrier coordinate system is performed by the following formula:

$$\begin{bmatrix} X_L \\ Y_L \\ Z_L \end{bmatrix} = \begin{bmatrix} X_{0L} \\ Y_{0L} \\ Z_{0L} \end{bmatrix} + R \begin{bmatrix} X_b \\ Y_b \\ Z_b \end{bmatrix},$$

wherein R is the first transformation matrix, $[X_{OL} \ Y_{OL} \ Z_{OL}]^T$ is a topocentric coordinate of the carrier, and R satisfies:

$$R = \begin{bmatrix} \cos r \cdot \cos y - & & \sin r \cdot \cos y + \\ \sin r \cdot \sin p \cdot \sin y & -\sin y \cdot \cos p & \sin p \cdot \sin y \cdot \cos r \\ \sin y \cdot \cos r + & & \sin r \cdot \sin y - \\ \sin r \cdot \sin p \cdot \cos y & \cos p \cdot \cos y & \sin p \cdot \cos r \cdot \cos y \\ -\sin r \cdot \cos p & \sin p & \cos r \cdot \cos p \end{bmatrix}$$

wherein p, r and y are a pitch angle, a roll angle and a heading angle of the carrier respectively;

wherein a transformation between the topocentric coordinate system and the earth-centered earth-fixed coordinate system is performed by the following formula:

$$\begin{bmatrix} X_e \\ Y_e \\ Z_e \end{bmatrix} = \begin{bmatrix} X_{0e} \\ Y_{0e} \\ Z_{0e} \end{bmatrix} + R_L^e \begin{bmatrix} X_L \\ Y_L \\ Z_L \end{bmatrix},$$

wherein $R_L^e$ is the second transformation matrix, $[X_{0e}\ Y_{0e}\ Z_{0e}]^T$ is an earth-centered earth-fixed coordinate of a topocentric origin, and $R_L^e$ satisfies:

$$R_L^e = \begin{bmatrix} -\sin\theta & -\cos\theta \cdot \sin\varphi & \cos\theta \cdot \cos\varphi \\ \cos\theta & -\sin\theta \cdot \cos\varphi & \sin\theta \cdot \cos\varphi \\ 0 & \cos\phi & \sin\varphi \end{bmatrix},$$

wherein θ and φ are the longitude and latitude of the carrier respectively.

3. The system according to claim 1, wherein during the movement of the carrier and the base stations, the theoretical coordinate value of the antenna baseline vector in the earth-centered earth-fixed coordinate system is calculated by the following formula:

$$\begin{bmatrix} X_e' \\ Y_e' \\ Z_e' \end{bmatrix} = \begin{bmatrix} X_{0e} \\ Y_{0e} \\ Z_{0e} \end{bmatrix} + R_L^e \begin{bmatrix} X_L' \\ Y_L' \\ Z_L' \end{bmatrix},$$

wherein $R_L^e$ is the second transformation matrix, $[X_e'Y_e'Z_e']^T$ is the theoretical coordinate value of the antenna baseline vector in the earth-centered earth-fixed coordinate system, $[X_{0e}\ Y_{0e}\ Z_{0e}]^T$ is the earth-centered earth-fixed coordinate of the topocentric origin, $[X_L'Y_L'Z_L']^T$ is the coordinate of the antenna baseline vector in the topocentric coordinate system, satisfying:

$$\begin{bmatrix} X_L' \\ Y_L' \\ Z_L' \end{bmatrix} = \begin{bmatrix} X_{1L} \\ Y_{1L} \\ Z_{1L} \end{bmatrix} + R\begin{bmatrix} X_b \\ Y_b \\ Z_b \end{bmatrix} = \begin{bmatrix} X_{0L} \\ Y_{0L} \\ Z_{0L} \end{bmatrix} + \Delta L + R\begin{bmatrix} X_b \\ Y_b \\ Z_b \end{bmatrix},$$

wherein $[X_b\ Y_b\ Z_b]^T$ is the coordinate of the carrier of the base stations in the carrier coordinate system, R is the first transformation matrix, ΔL is a displacement vector of the carrier of the base stations moving from an initial position to a current position, $[X_{0L}\ Y_{0L}\ Z_{0L}]^T$ is the coordinate of the initial position of the carrier of the base stations in the topocentric coordinate system, and $[X_{1L}\ Y_{1L}\ Z_{1L}]^T$ is the coordinate of the current position of the carrier of the base stations in the topocentric coordinate system, wherein $$\begin{bmatrix} X_{1L} \\ Y_{1L} \\ Z_{1L} \end{bmatrix} = \begin{bmatrix} X_{0L} \\ Y_{0L} \\ Z_{0L} \end{bmatrix} + \Delta L.$$

4. The system according to claim 1, wherein the step d) comprises the following steps:

d1) determining a carrier phase measurement value of the pseudo user u for the satellite i as:

$$\varnothing_u^{(i)} = \lambda^{-1} \cdot [r_u^{(i)} + c \cdot (\delta t_u - \delta t^{(i)}) - I_u^{(i)} + T_u^{(i)}] + N_u^{(i)} + \varepsilon_{\varnothing,u}^{(i)},$$

wherein $\varnothing_u^{(i)}$ is the carrier phase measurement value of the satellite i by the pseudo user u, λ is a wavelength, $r_u^{(i)}$ is a geometric distance between the pseudo user u and satellite i, c is speed of light, $\delta t_u$ is a pseudo user receiver clock error, $\delta t^{(i)}$ is a satellite clock error, $I_u^{(i)}$ is an ionospheric delay, $T_u^{(i)}$ is a tropospheric delay, $N_u^{(i)}$ is a pseudo user integer ambiguity, and $\varepsilon_{\varnothing,u}^{(i)}$ is a pseudo user carrier phase measurement noise;

d2) determining a single difference carrier phase measurement value of the pseudo user u and the reference station r for the satellite i as:

$$\varnothing_{ur}^{(i)} = \varnothing_u^{(i)} - \varnothing_r^{(i)} = \lambda^{-1} \cdot r_{ur}^{(i)} + f \cdot \delta t_{ur} + N_{ur}^{(i)} + \varepsilon_{\varnothing,ur}^{(i)},$$

wherein $\varnothing_{ur}^{(i)}$ is the single difference carrier phase measurement value of the pseudo user u and reference station r for the satellite i, $\varnothing_u^{(i)}$ is a carrier phase measurement value of the pseudo user u for the satellite i, $\varnothing_r^{(i)}$ is a carrier phase measurement value of the reference station r for the satellite i, λ is the wavelength, $r_{ur}^{(i)}$ is a single difference of the geometric distance between the pseudo user u and the satellite i, and the geometric distance between the reference station r and satellite i, f is a carrier frequency, $\delta t_{ur}$ is a single difference between the pseudo user receiver clock error and a reference station receiver clock error, $\varepsilon_{\varnothing,ur}^{(i)}$ is a single difference between the pseudo user integer ambiguity and a reference station integer ambiguity, $\varepsilon_{\varnothing,ur}^{(i)}$ is a single difference between the pseudo user carrier phase measurement noise and a reference station carrier phase measurement noise;

d3) determining a double difference carrier phase measurement value of the pseudo user u and the reference station r for the satellites i and j as:

$$\varnothing_{ur}^{(ij)} = \varnothing_{ur}^{(i)} - \varnothing_{ur}^{(j)} = \lambda^{-1} r_{ur}^{(ij)} + N_{ur}^{(ij)} + \varepsilon_{\varnothing,ur}^{(ij)},$$

wherein $\varnothing_{ur}^{(ij)}$ is the double difference carrier phase measurement value of the pseudo user u and the reference station r for the satellite i and satellite j, $\varnothing_{ur}^{(i)}$ is the single difference carrier phase measurement value of the pseudo user u and the reference station r for the satellite i, $\varnothing_{ur}^{(j)}$ is a single difference carrier phase measurement value of the pseudo user u and the reference station r for the satellite j, and λ is the wavelength, $r_{ur}^{(ij)}$ is a double difference of the geometric distances between the pseudo user u and the reference station r and satellite i and satellite j, $N_{ur}^{(ij)}$ is a double difference between the pseudo user integer ambiguity and the reference station integer ambiguity, and $\varepsilon_{\varnothing,ur}^{(ij)}$ is a double difference between the pseudo user carrier phase measurement noise and reference station carrier phase measurement noise;

d4) solving the measurement value of the antenna baseline vector as:

$$r_{ur}^{(i)} = -b_{ur} \cdot l^{(i)},$$

wherein $b_{ur}$ is a measurement value of the antenna baseline vector between the two receivers of the pseudo user and the reference station, $l^{(i)}$ is an observation direction unit vector of the receiver for the satellite i, and $r_{ur}^{(i)}$ is a single difference geometric distance from the pseudo user u and the reference station r to the satellite i, wherein a double difference geometric distance from the pseudo user u and the reference station r to satellites i and j is as follows:

$$r_{ur}^{(ij)} = -b_{ur} \cdot l^{(i)} + b_{ur} \cdot l^{(j)} = -(l^{(i)} - l^{(j)}) \cdot b_{ur},$$

wherein $l^{(j)}$ is an observation direction unit vector of the receivers for the satellite j, wherein the double difference geometric distance from the pseudo user u and the reference station r to the satellites i and j is substituted into the double difference carrier phase measurement value of the pseudo user u and the reference station r for the satellites i and j:

$$\varnothing_{ur}^{(ij)} = \lambda^{-1}(l^{(i)} - l^{(j)}) \cdot b_{ur} + N_{ur}^{(ij)} + \varepsilon_{\varnothing,ur}^{(ij)};$$

wherein the pseudo user u and the reference station r simultaneously observe M satellites and obtain M−1 mutually independent double difference carrier phase measurement values, which are written in the following matrix form:

$$\begin{bmatrix} \varnothing_{ur}^{(21)} \\ \varnothing_{ur}^{(31)} \\ \ldots \\ \varnothing_{ur}^{(M1)} \end{bmatrix} = \lambda^{-1} \cdot \begin{bmatrix} -(l^{(2)} - l^{(1)})^T \\ -(l^{(3)} - l^{(1)})^T \\ \ldots \\ -(l^{(M)} - l^{(1)})^T \end{bmatrix} \cdot b_{ur} + \begin{bmatrix} N_{ur}^{(21)} \\ N_{ur}^{(31)} \\ \ldots \\ N_{ur}^{(M1)} \end{bmatrix},$$

wherein when the double difference carrier phase measurement value is known, a LAMBDA algorithm is used to solve the integer ambiguity, and a double difference integer ambiguity is calculated to solve the measurement value $b_{ur}$ of the antenna baseline vector.

5. The system according to claim 1, wherein the position domain error of the antenna baseline vector change rate in x, y and Z directions at epoch K is calculated as follows:
recording the theoretical coordinate value $[X_e' Y_e' Z_e']^T$ of the antenna baseline vector in the earth-centered earth-fixed coordinate system as:

$$b_t = \begin{bmatrix} X_e' \\ Y_e' \\ Z_e' \end{bmatrix} = \begin{bmatrix} X_t \\ Y_t \\ Z_t \end{bmatrix},$$

wherein the change rate of a theoretical value of the antenna baseline vector at epoch k is:

$$\dot{b}_t(k) = \begin{bmatrix} \dot{X}_t(k) \\ \dot{Y}_t(k) \\ \dot{Z}_t(k) \end{bmatrix},$$

wherein $\dot{X}_t(k)$, $\dot{Y}_t(k)$ and $\dot{Z}_t(k)$ are the change rates of the theoretical value of the baseline vector at time k in three directions, satisfying:

$$\dot{X}_t(k) = \frac{X_t(k) - X_t(k-1)}{\tau},$$

$$\dot{Y}_t(k) = \frac{Y_t(k) - Y_t(k-1)}{\tau},$$

$$\dot{Z}_t(k) = \frac{Z_t(k) - Z_t(k-1)}{\tau},$$

wherein $\tau$ is a sampling interval of the receivers;
recording the measurement value $b_{ur}$ of the antenna baseline vector as:

$$b_m = b_{ur} = \begin{bmatrix} X_m \\ Y_m \\ Z_m \end{bmatrix},$$

wherein the change rate of the measurement value of the antenna baseline vector at epoch k is:

$$\dot{b}_m(k) = \begin{bmatrix} \dot{X}_m(k) \\ \dot{Y}_m(k) \\ \dot{Z}_m(k) \end{bmatrix},$$

wherein $X'_m(k)$, $Y'_m(k)$ and $Z'_m(k)$ are the change rates of the measurement value of the baseline vector in three directions at time k, and wherein the position domain error of the antenna baseline vector change rate in x, y and z directions at epoch k is expressed as:

$$\dot{\varepsilon}_0 = \dot{b}_m - \dot{b}_t = \begin{bmatrix} \dot{X}_m - \dot{X}_t \\ \dot{Y}_m - \dot{Y}_t \\ \dot{Z}_m - \dot{Z}_t \end{bmatrix} = \begin{bmatrix} \dot{\varepsilon}_x \\ \dot{\varepsilon}_y \\ \dot{\varepsilon}_z \end{bmatrix}.$$

6. The system according to claim 5, wherein the position domain errors of the baseline vectors of multiple antennas are normalized as:

$$\dot{\varepsilon}_i = \frac{\dot{\varepsilon}_{0i}}{\delta_i},$$

wherein $\dot{\varepsilon}_i$ is normalized value of the position domain errors, $\dot{\varepsilon}_{0i}$ is the position domain error of the $i^{th}$ baseline before normalization, and $\delta_i$ is a coefficient factor;
wherein the normalized value of the position domain errors is square-normalized in three directions of x, y and z according to the following formulas:

$$Y_{nxi} = \left(\frac{\dot{\varepsilon}_{xi} - \mu_{xi}}{\sigma_{xi}}\right)^2,$$

$$Y_{nyi} = \left(\frac{\dot{\varepsilon}_{yi} - \mu_{yi}}{\sigma_{yi}}\right)^2,$$

-continued $$Y_{nzi} = \left(\frac{\varepsilon'_{zi} - \mu_{zi}}{\sigma_{zi}}\right)^2,$$

wherein the obtained square-normalized values $Y_{nxi}$, $Y_{nyi}$ and $Y_{nzi}$ are taken as cumulative sum algorithm input values of the $i^{th}$ antenna baseline vector in x, y and z directions, $\varepsilon'_{xi}$, $\varepsilon'_{yi}$ and $\varepsilon'_{zi}$ respectively represent the position domain errors of the $i^{th}$ baseline in x, y and z directions, $\mu_{xi}$, $\mu_{yi}$ and $\mu_{zi}$ respectively represent the mean values of the position domain errors of the $i^{th}$ baseline in x, y, and z directions, and, $\sigma_{xi}$, $\sigma_{yi}$ and $\sigma_{zi}$ respectively represent standard deviations of the position domain errors of the $i^{th}$ baseline in x, y, and z directions.

7. The system according to claim 1, wherein the cumulative sum is expressed as:

$$C_0^+ = \frac{H}{2},$$
$$C_n^+ = \max(0, C_{n-1}^+ + Y_n - k),$$

wherein $C_0^+$ represents a cumulative sum initial value at time 0, $C_n^+$ represents the cumulative sum at time n, $Y_n$ represents a cumulative sum input value, k represents a window factor related to the standard deviation, and H is an error monitoring threshold value.

8. The system according to claim 7, wherein the error monitoring threshold value is obtained by the following steps:
dividing cumulative sum into M intervals with M+1 states from 0 to H;
calculating an ARL value as:

$$(I-P_R')\cdot W = I_1,$$

wherein $P_R'$ is a matrix after removing the last column and the last row of a matrix P, I is a unit matrix of (M+1)(M+1), W is a vector corresponding to the ARL value of the cumulative sum from state 0 to M, and an element in the middle is the ARL value corresponding to the cumulative sum starting from H/2; and presetting an error monitoring threshold value H, continuously iterating the ARL value until a calculated nominal ARL is equal to the reciprocal of the assigned integrity risk, and then inversely calculating the corresponding error monitoring threshold value.

9. The system according to claim 7, wherein the window factor is calculated by the following formula:

$$k = -\frac{\ln(\sigma_0)^2 - \ln(\sigma_1)^2}{(2\sigma_1^2)^{-1} - (2\sigma_0^2)^{-1}},$$

wherein $\sigma_0$ is a standard deviation under a normal condition and $\sigma_1$ is a standard deviation under an out-of-control condition to be detected.

10. The system according to claim 1, wherein the cumulative sum is compared with the error monitoring threshold value as:

$$F_I = \begin{cases} 0, & -C_n^+ < H \\ 1, & -C_n^+ \geq H \end{cases},$$

wherein when cumulative sum exceeds the error monitoring threshold value, an integrity risk alarm is issued.

* * * * *